United States Patent
Seace

(10) Patent No.: US 7,513,728 B1
(45) Date of Patent: *Apr. 7, 2009

(54) REDUCED MATERIAL FASTENER

(75) Inventor: Barry W. Seace, Sarasota, FL (US)

(73) Assignee: The Everhold Group, Corporation, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/509,926

(22) Filed: Aug. 25, 2006

Related U.S. Application Data

(63) Continuation of application No. 10/740,379, filed on Dec. 18, 2003, now Pat. No. 7,097,403.

(60) Provisional application No. 60/434,351, filed on Dec. 18, 2002.

(51) Int. Cl.
F16B 39/22 (2006.01)
F16B 15/00 (2006.01)
F16B 15/08 (2006.01)

(52) U.S. Cl. .................... 411/287; 411/452; 411/451.4; 411/451.1

(58) Field of Classification Search ................. 411/287, 411/452, 451.4, 451.1, 922, 453, 463
See application file for complete search history.

(56) References Cited

U.S. PATENT DOCUMENTS

| 3,764,278 | A | * | 10/1973 | Ivanier | 428/592 |
| 4,637,768 | A | * | 1/1987 | Rabe | 411/452 |
| 4,755,091 | A | * | 7/1988 | Potucek et al. | 411/452 |
| 4,815,910 | A | * | 3/1989 | Potucek | 411/444 |
| 4,973,211 | A | * | 11/1990 | Potucek | 411/452 |
| 5,092,501 | A | * | 3/1992 | Potucek | 223/85 |
| 5,143,501 | A | * | 9/1992 | Leistner et al. | 411/442 |
| 5,155,960 | A | * | 10/1992 | Shaanan | 52/584.1 |
| 5,192,169 | A | * | 3/1993 | Landsberg | 405/259.1 |
| 7,097,403 | B1 | * | 8/2006 | Seace | 411/287 |

* cited by examiner

Primary Examiner—Victor Batson
Assistant Examiner—David C Reese
(74) Attorney, Agent, or Firm—Arthur G. Yeager

(57) ABSTRACT

A reduced material fastener has a shank cross-section selected to provide a parting line. Having a parting line means that the fastener may be made using two opposing dies, including roller dies, to cold form the cross-section. The cross-sections do not have to be symmetrical with respect to the parting line as long as hypothetical dies can be separated. Typical fasteners include common nails. Cross-sections having parting lines may have fin-like protuberances that result in less material being used for the same overall outline as a round cross-section. A computer aided design methodology and a nail making apparatus are also disclosed.

18 Claims, 19 Drawing Sheets

REDUCED MATERIAL FASTENER

CROSS-REFERENCE TO RELATED APPLICATION

This application claims priority to provisional application No. 60/434,351, filed on Dec. 18, 2002 by the same inventor, the entire contents of which are incorporated herein by reference. This application is a continuation of application Ser. No. 10/740,379, filed Dec. 18, 2003, now U.S. Pat. No. 7,097,403, dated 08129/2006.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the field of fasteners and nails with integral locking means comprising protrusions on the shank in the form of longitudinal ribs.

2. Related Art

Nails have been around for thousands of years. During that time they have been made using different methods. One-way of forming a nail was to start with a bit of steel and shape it by hand on an anvil. Another way was to cut elongate rectangles from a sheet of steel. During these earlier times, nails were a high tech item and were quite valuable. It was not uncommon to burn down old buildings in order to collect the nails from the ashes.

In the early 1800s there was a change in the way nails were made. Wire making had been developed to a point that wire was readily available and round shaped nails, made from wire, began to appear. These nails were made from a length of wire that had a flattened cylindrical head hammered on one end and a point cut on the other. This form of nail was very easy to make from wire and has not changed in any fundamental way for over one hundred years. Some minor features such as enlarged heads, cement coatings, or surface textures have been added in order to improve the holding power when used is specific applications such as dry wall or roofing operations.

There are some disadvantages to a round cylindrically-shaped nail.

First, a round cylindrical nail uses the maximum amount of steel for a given cross-section. The cost of the steel wire is between 50 and 80 percent of the total expense in making nails, and any decrease in the steel used in each nail would lead to a significant increase in potential profit.

The second disadvantage of a round cylindrical nail is that it has a tendency to wedge wood apart. Assuming the wood is not split, a common occurrence, the wood fibers spread apart in such a way as to form an eye-shaped opening around the nail. This shape decreases the holding power of a round nail by reducing the amount of surface area, the nail perimeter times its length, which is in contact with the wood. As a corollary to the first disadvantage, a round nail has the smallest amount of surface area for any amount of steel.

The disadvantages of a round nail have not gone unnoticed. U.S. Pat. No. 340,692, issued Apr. 27, 1886 to Bailey for a "Wire Nail," discloses a nail with a dozen or so longitudinal ridges and channels on the shank. In the illustrations, the height of the ridges and depths of the channels are not large, but the nail is useful as a furniture nail because it will not turn on its axis. Also, the strength to weight ratio is increased.

Rail spikes, rather than join two pieces of wood, hold down an iron rail. The traditional rail spike has an almost square cross-section. However, there have been a large number of attempted improvements in this field as well. An example is U.S. Pat. No. 927,301, issued Jul. 6, 1909 to Walcott for a "Spike". This patent discloses a modified rail spike with a shank that has a half-round shape opposite the rail side and, on the rail side, three longitudinal convex flanges with two intervening concave grooves. The inventor emphasizes that "The curves of the concave grooves run smoothly and continuously into the convex flanges without angles." This has special value in avoiding splitting of the tie and increasing holding power.

U.S. Pat. No. 2,014,746, issued Sep. 17, 1935 to Robergel for "Method of Making Nails," discloses a nail having a "cross-shaped or, more generally, star shaped" shank. FIG. 3 illustrates the cross-shaped version as having rectangular arms of equal length. The method of making this particular part of the nail is not specified, but it is pointed out that the beginning and ending cross-section have the same area.

U.S. Pat. No. 4,637,768, issued Jan. 20, 1987 to Rabe for a "Nail-Type Fastener . . . ," discloses a nail having a shank cross-section with three four-sided V-like grooves disposed at 120° around the nail shank. This cross-section is manufactured with three cold-rollers at 120° followed by a second set to deepen the grooves. The purpose of the grooves is to increase the ratio of frictional surface to weight so as to increase pull grip. The ribs between grooves increase flexural rigidity. The cold-rolling operation is designed to produce material flow in both longitudinal and transverse directions. The transverse flow is to increase strength.

U.S. Pat. Nos. 4,755,091 issued Jul. 5, 1988 to Potucek et al. for "Star Fasteners" and 4,973,211 issued Nov. 27, 1990 to Potucek for "Star Fastener," disclose non-round nail shapes. The preferred embodiment appears to be a nail with a five pointed star-like cross-section. These nails performed as well as, or in some cases better than traditional nails and were made using 50% less steel. These patents also discuss a 15% increase in surface area compared to a round nail of the same overall diameter and a 60% increase in holding power due to wedging and compression of fibers in the cups between the star points. As illustrated in U.S. Pat. Nos. 4,800,746, issued Jan. 31, 1989 and 4,833,906, issued May 30, 1989, both to Potucek, five pointed nails could be produced by cold rolling five grooves longitudinally down round wire feedstock.

U.S. Pat. No. 5,836,826, issued Nov. 17, 1998 to Haraminac for a "Machine for Making Star Nails," attempted to overcome some problems with the previous approaches by using form rollers, but on conventionally formed nails as opposed to wire bar feedstock. These grooves displaced 50% of the steel during the forming process, producing a nail with a finished outer diameter larger than the starting wire. Although the new shape appeared to be promising, attempts to manufacture nails of this shape for a commercial market have not yet been successful. There appear to be several reasons for this.

First, the rolling system required to produce this shape is not common to the nail industry. Beyond that, the star nail rolling system proved to be difficult and expensive to build and maintain. The rollers in test machines had rolling edges which would not hold their shape long enough to be economically viable, and the machines could not be made to operate fast enough to be competitive.

Second, the displacement of the wire during the rolling process was hard to control or predict. Displacing 50% of the material in order to achieve a 50% steel savings was a significant feature of the Potucek patents, but moving such a large amount of material created technical problems that have not been overcome to date.

The preferred embodiment in Potucek's Star Fastener(s) patents is quite clearly a nail shank having a circular central shaft with five radial fins (rather like a starfish with thinner arms than the animal). Although the number of fins can vary from three upwards, they are always radial. Even though the new star shape appears to be a significant improvement on a round nail, the very star shape may have hindered development of practical production machinery.

Lastly, U.S. Pat. No. 5,143,501, issued to Leistner et al. for a "Grooved Nail and Strip," discloses three different nail shank cross-sections. One has four symmetrically disposed concave quarter circle grooves with radii the same or less than the half-width of the shank from ridge top to ridge top. Two opposing ridge tops are flat to facilitate forming a nail strip. Another cross-section has three similar, but larger radii, grooves and ridges at 120° and the third cross-section is essentially square. Compared to other non-circular cross sections, these are relatively smooth.

This patent teaches that "the holding power of a nail is simply the degree to which the wooden fibers are displaced transversely to, i.e., across the axis of the grain of wood," see FIG. 5. Thus, it states that, in practice, teeth or notches and various forms of knurlings or serrations have produced very little, if any, increase in holding power. It goes on to state that, although "some manufacturers still insist on achieving the sharpest possible teeth or notches", teeth or notches would tear the wood and reduce holding power. Therefore, the object of this invention is to provide increased wood separation for the same weight nail in a shape that also allows forming into nailing sticks. The cross-sections can be produced by extruding through a die with additional pointing and heading operations.

To add to the debate, one trick that experienced carpenters use to avoid splitting wood with common nails in some situations, is to blunt the point. This breaks some of the fibers so that it is easier to separate the remaining ones. Holding power should be reduced, however.

In spite of some inventive effort over many years, nails with non-circular cross-section shanks (or non-square ones in the case of rail spikes) as discussed in these patents are not in widespread use. Part of the problem is probably the difficulty in manufacturing. Therefore, what is needed is a nail shank design that, compared to a round one, provides reduced weight but has the same or increased holding power and can be manufactured using practical forming apparatus.

BRIEF SUMMARY OF THE INVENTION

The invention comprises a shank cross-section for a reduced material fastener that is selected to provide a parting line. Having a parting line means that the fastener may be made using two opposing dies to cold form the cross-section. The cross-sections do not have to be symmetrical with respect to the parting line as long as hypothetical dies can be separated. Typical fasteners include common nails.

Cross-sections having parting lines may have fin-like protuberances that result in less material being used for the same overall outline as a round cross-section. Intervening valley-like regions between the fin-like protuberances are connected to the tops of adjacent protuberances with substantially straight lines. Although not essential, it is preferable that the valley regions and fin tops are rounded. Sometimes it may be desirable to use a conical transition from the shank to the head as described herein.

Although not necessary to practicing the invention, cross-sections can be conveniently designed by following a process described herein that uses computer-aided design to produce a desired overall diameter and cross-sectional area.

Although not necessary to produce a reduced material fastener employing the shank described herein, a particular quarter-circle rolling die design, also described herein, could work on wire feedstock to produce a headed and pointed nail and separate the finished nail in an integrated operation.

BRIEF DESCRIPTION OF THE SEVERAL VIEWS OF THE DRAWING

The invention will now be described in more detail with reference to preferred forms of the inventions, given only by way of example, with reference to the accompanying drawings, in which.

DETAILED DESCRIPTION OF THE INVENTION

Figure 1:
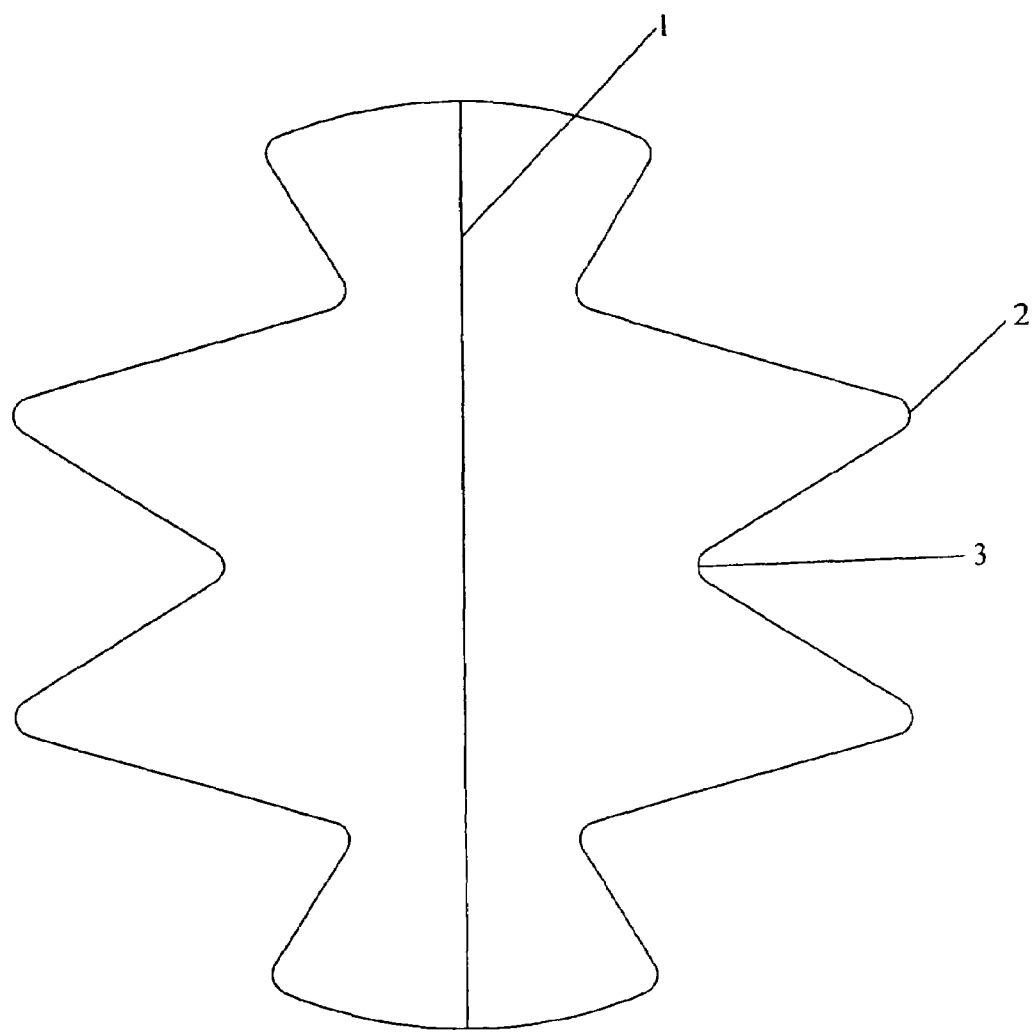
FIG. 1 illustrates the general concept of a nail shank cross-section having a parting line.

FIG. 1 shows the cross-sectional shape of a fastener or nail shank that illustrates the general design concept of the invention. First, the shape has an internal parting line 1. The parting line is an imaginary straight line running through the cross-section and divides it into two, not necessarily identical, parts.

Figure 2:
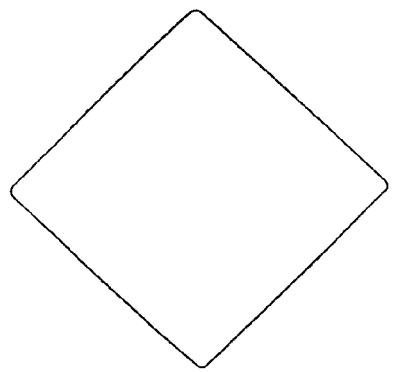
FIGS. 2-7 illustrate several variations on the concept illustrated in FIG. 1.
Figure 3:
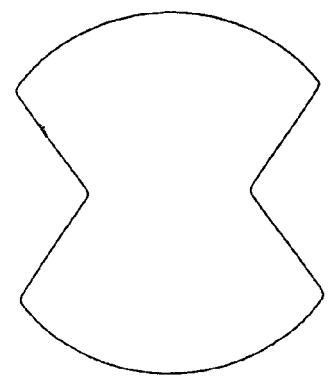
Figure 4:
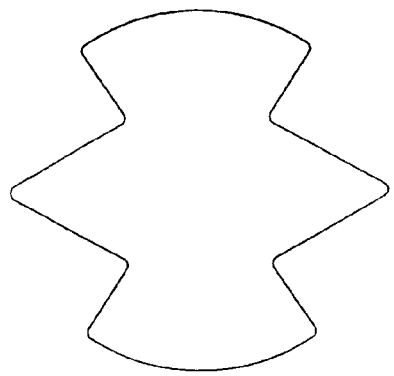
Figure 5:
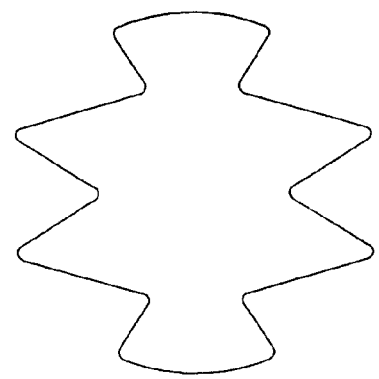
Figure 6:
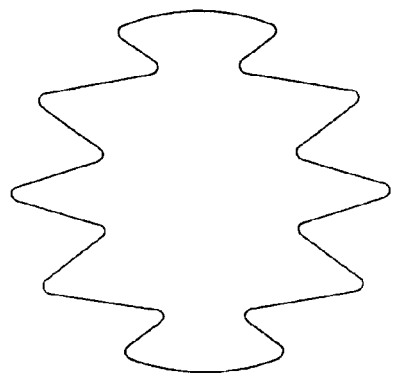
Figure 7:
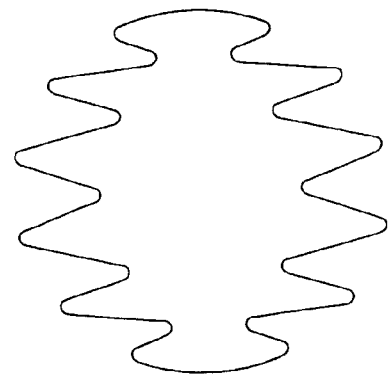
Figure 8:
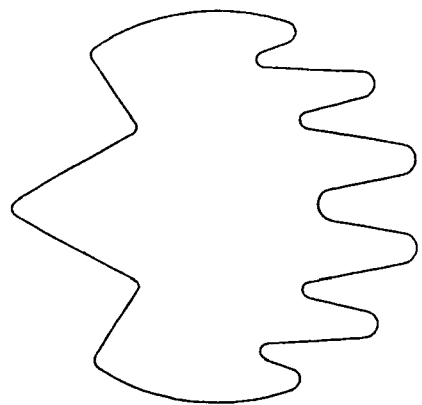
FIGS. 8 and 9 illustrate asymmetric versions of the concept illustrated in FIG. 1.
Figure 9:
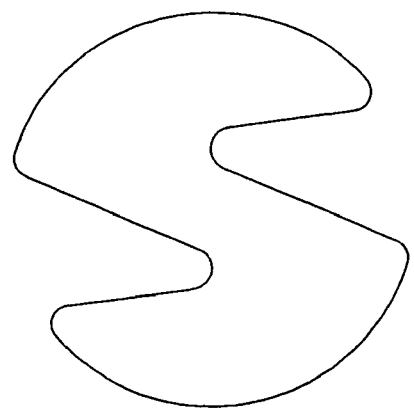
Figure 10:
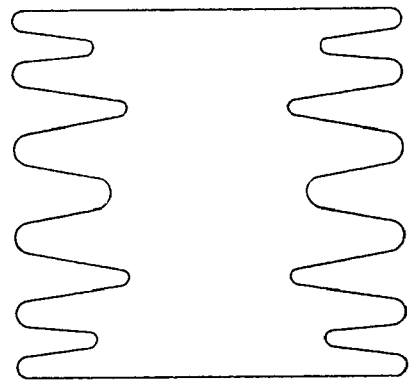
FIGS. 10 and 11 illustrate more extreme version of the concept illustrated in FIG. 1.
Figure 11:
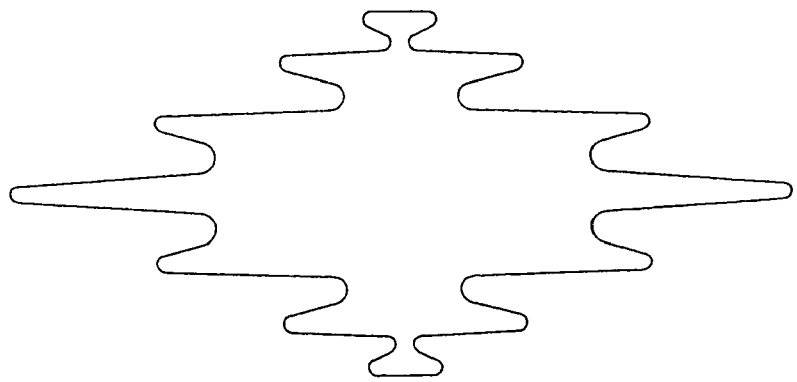

Second, on each side of the parting line are a series of fin-like protuberances (fins) 2 that are separated by valley-like indentations (valleys) 3. Usually, for aesthetic reasons at least, the shape would be symmetrical about the parting line. FIGS. 2-7 illustrate symmetrical cross-sections having 1 to 6 fins on each side, respectively. Note that FIG. 2 is provided as an illustrative geometry and is not part of this invention. FIGS. 8 and 9 illustrate non-symmetrical cross-sections. FIGS. 10 and 11 illustrate symmetrical, but more fanciful cross-sections.

The third general design feature, perhaps the most important, is that the fin and valley shapes should not undercut each other relative to the parting line. FIG. 1 most clearly shows this feature, but it is present in other designs as well. From any point on the perimeter of the cross-section, it is possible to move perpendicularly away from the parting line 1 without encountering any of the fastener material. Put another way, if the parting line is a horizontal floor, there should be at most sheer cliffs. This makes it possible to produce the cross-section using two split forming dies. In general, the design should adhere to well-known rules of split die design so that the dies could open freely away from the parting line.

Fourth, the fin and valley designs may be produced from any combination of straight or curved lines, but in the preferred embodiment, the top of the fins and bottom of the valleys should have a non-negligible radius of curvature to reduce tool wear. For simplicity in a design process, as described below, part circles can be used and connected with straight lines.

In a radial nail, the bending characteristics are essentially the same for any direction in which the bend occurs. With the design concept present in this invention, the bending moment can be greater in all directions using less material. This is because the bending strength of a beam is proportional to a dimension perpendicular to the bend and the square of a dimension in the plane of the bend. As applied to nails, for the same amount of material, fins increase the effective diameter perpendicular to the bend in all directions. This is easy to comprehend with Potucek's star shapes, but is also true for most of the cross-sections of the present invention.

Figure 12:
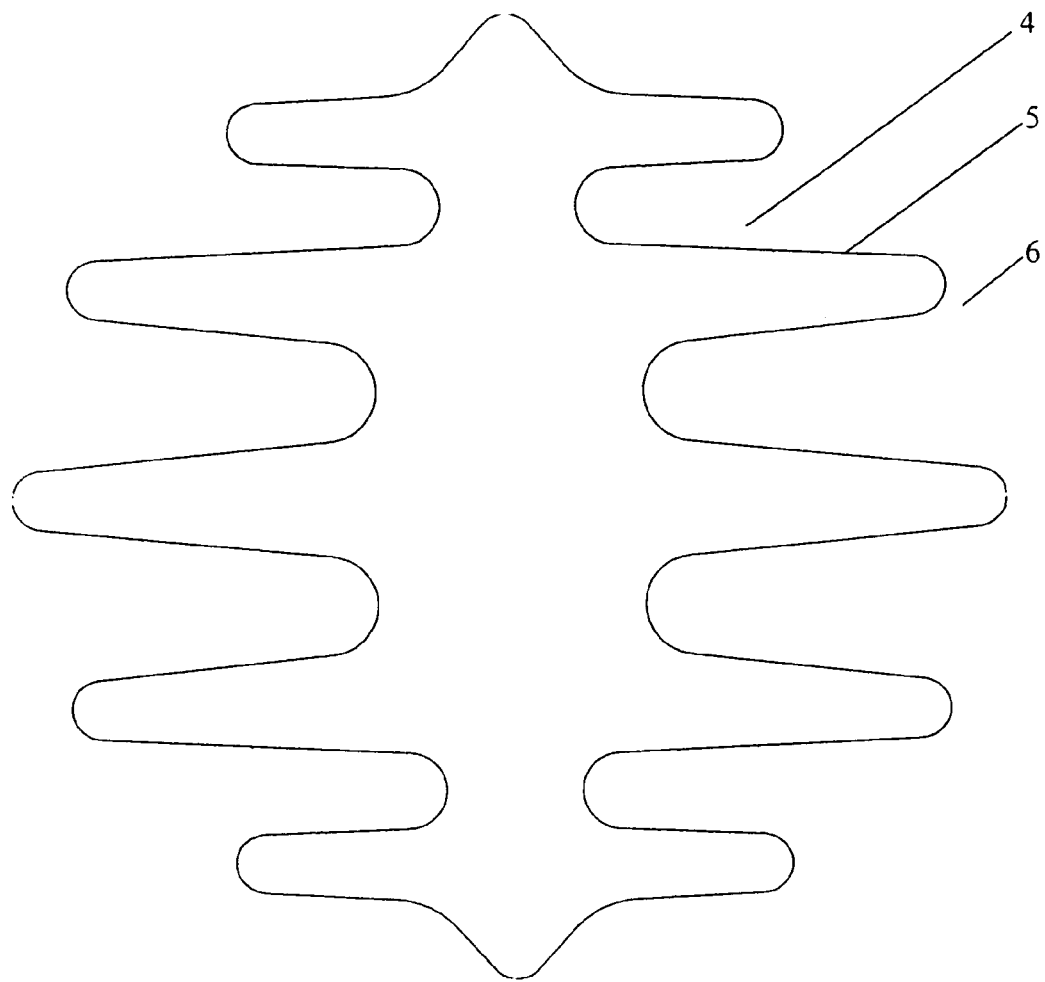
FIG. 12 illustrates some dimensions for a typical version of the concept illustrated in FIG. 1.
Figure 13:
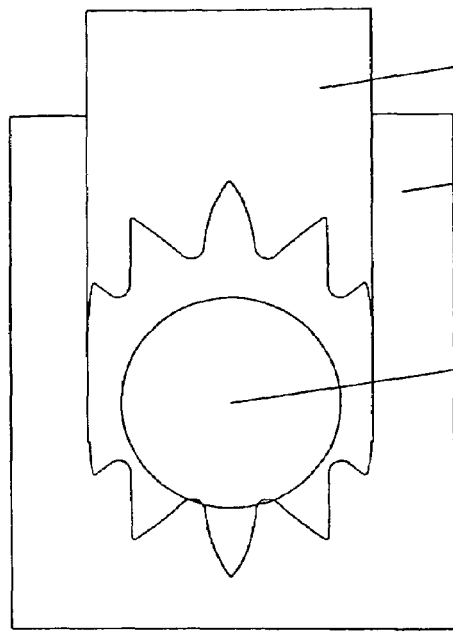
FIGS. 13-16 show how a two-part die can be used to form a typical nail shank.
Figure 14:
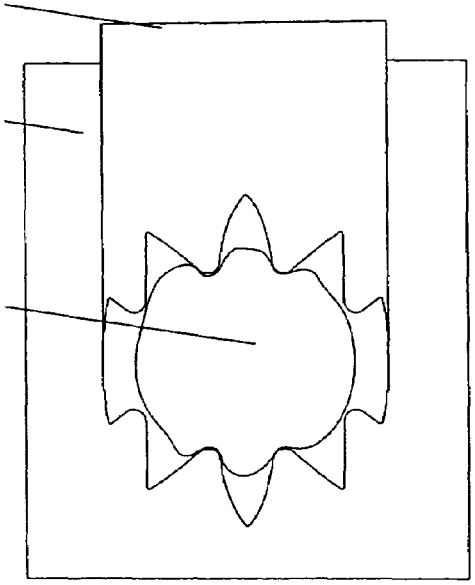
Figure 15:
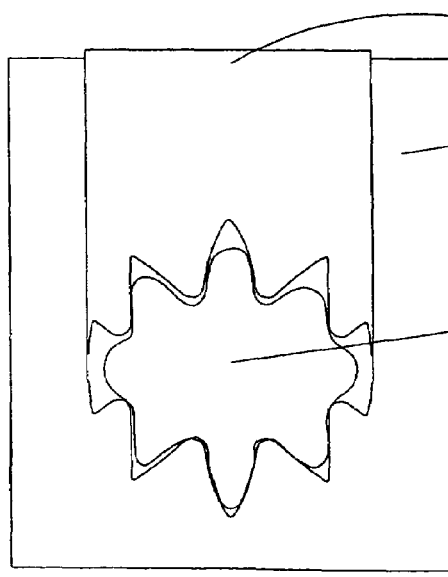
Figure 16:
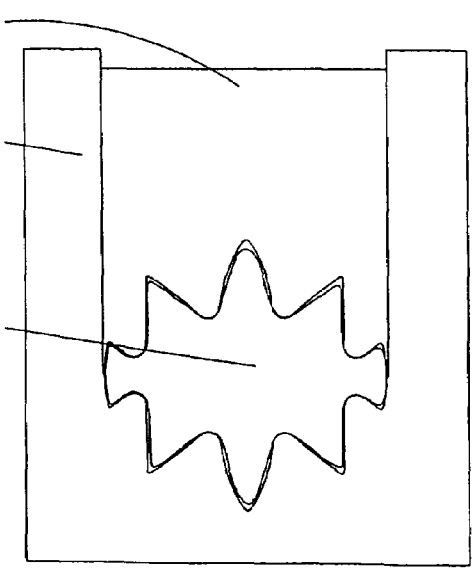

FIG. 12 illustrates a more typical shape than some of the others. The outline 5 (not to scale) is formed from an 11 ga. circular wire with the relative outline 4 having a diameter of 0.120 in., a cross-sectional area of 0.0113 square in. and a perimeter of 0.377 in. The outer bounding diameter 6 is 0/1620 in., which is the size of an 8-gauge wire equivalent to a 16 D common nail. The surface area of the new nail shape is three times larger than that of the starting wire. By way of this invention, a smaller wire has been reshaped to form a nail of a significantly larger outer diameter and greatly increased surface area.

FIGS. 13 through 16 show, in cross-section, how a two part die can be used to form a bilaterally shaped nail. In this case, round wire feedstock 52 is placed in the throat of a female die 51. The male counterpart 50 compresses and forms the round shape into the feedstock, but not overly so. If there is under fill, then the end product will have random voids. If overfill is occurring, then the die will have to force material along its longitudinal axis (increasing the length of the nail) as well as transversely and/or material may be forced between the die mating surfaces causing undesirable flashing. Overfill will require increased die pressure and produced increased wear. It should be noted that in production, the die forming would take place at very high repetition rates. Obviously, the match must be within a compromise tolerance.

Figure 17:
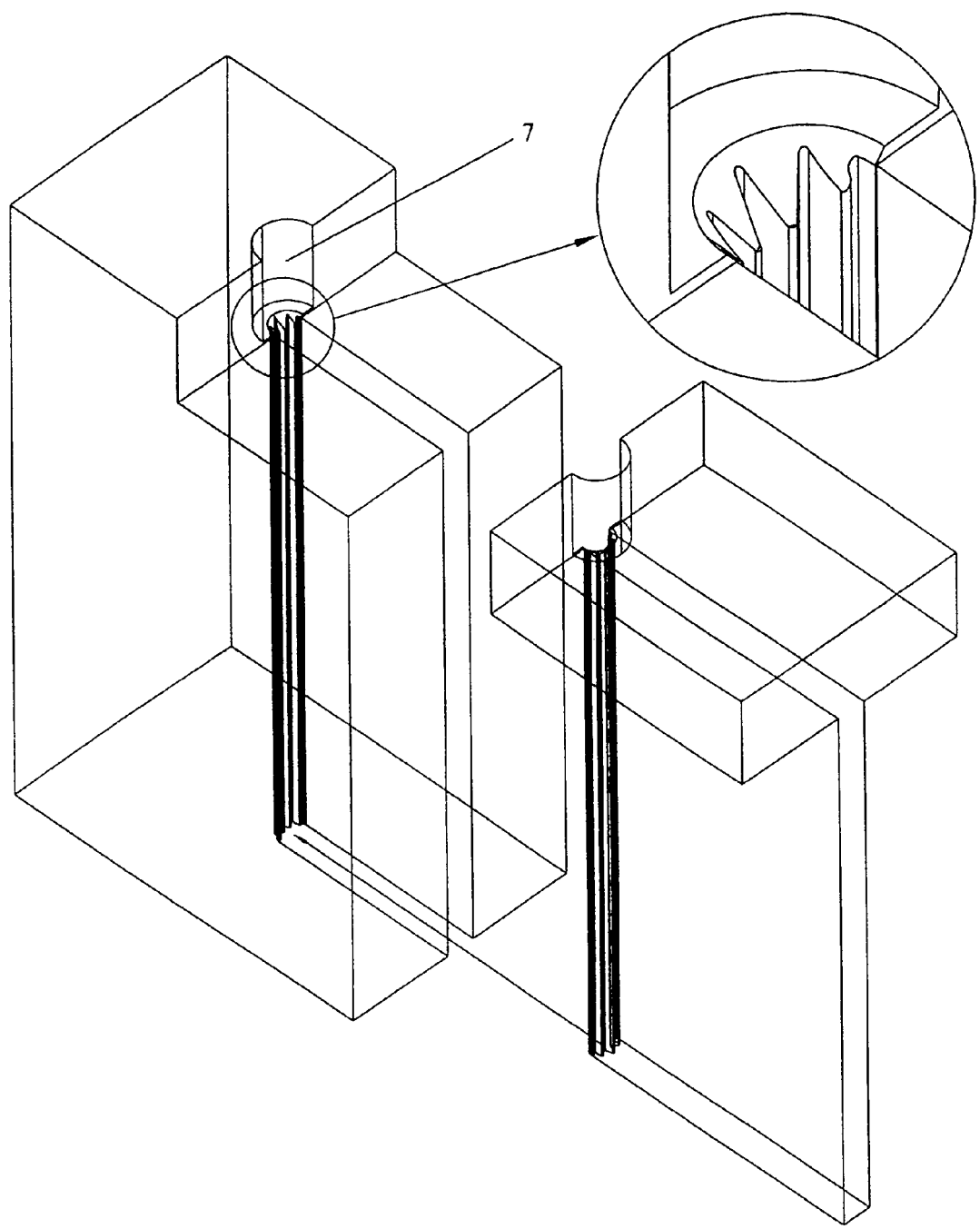
FIG. 17 illustrates how the dies in FIGS. 13-16 can be modified to form a nail head.

For a typical design, FIG. 17 shows a die with a cavity at the top designed to allow a cold punch to form the remaining wire into a head shape. This makes it possible to form a head and a reduced taper or point without having to remove the partially formed nail. This is possible, in part, because the cross-sectional area of the feedstock and the finished nail are approximately the same so that the nail is not significantly elongated as it is being formed.

Figure 18:
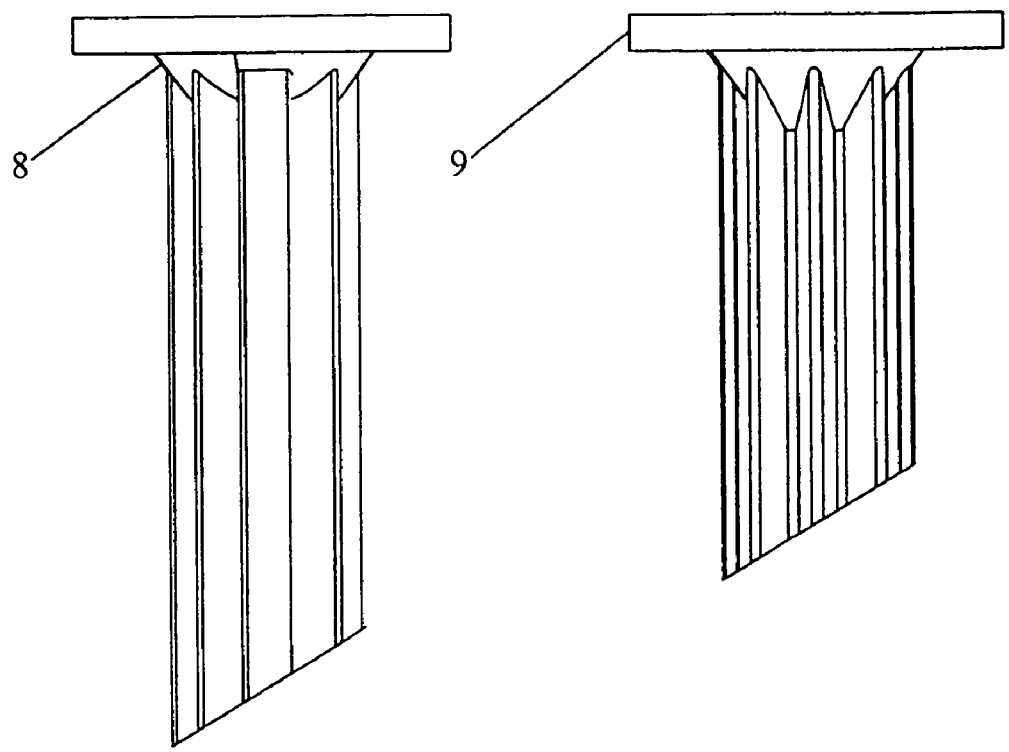
FIGS. 18-20 illustrate three possible designs for transitions from the nail head to its shank.
Figure 19:
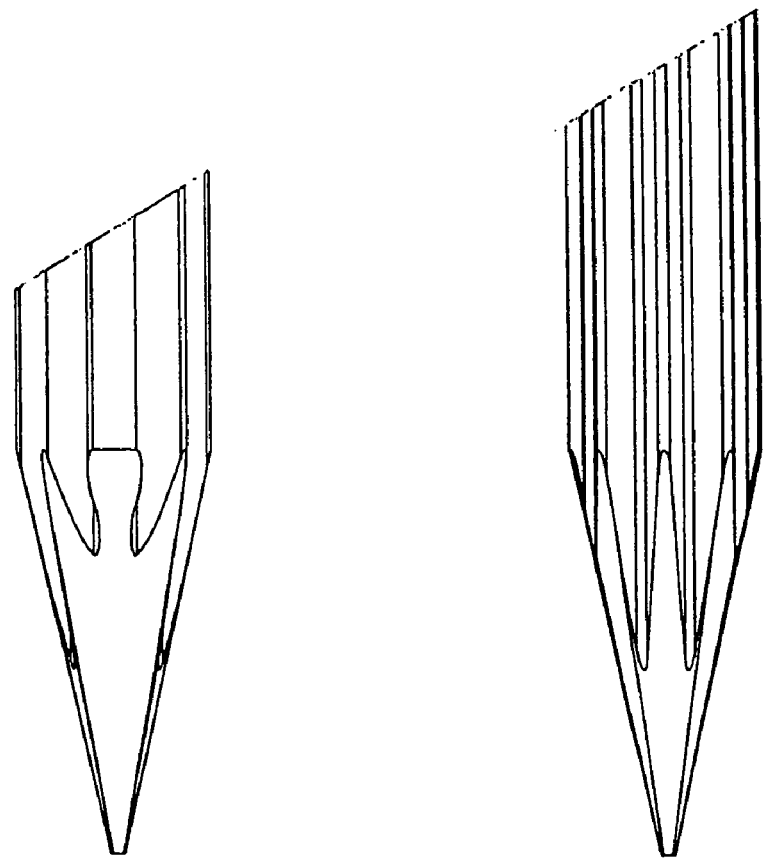
Figure 20:
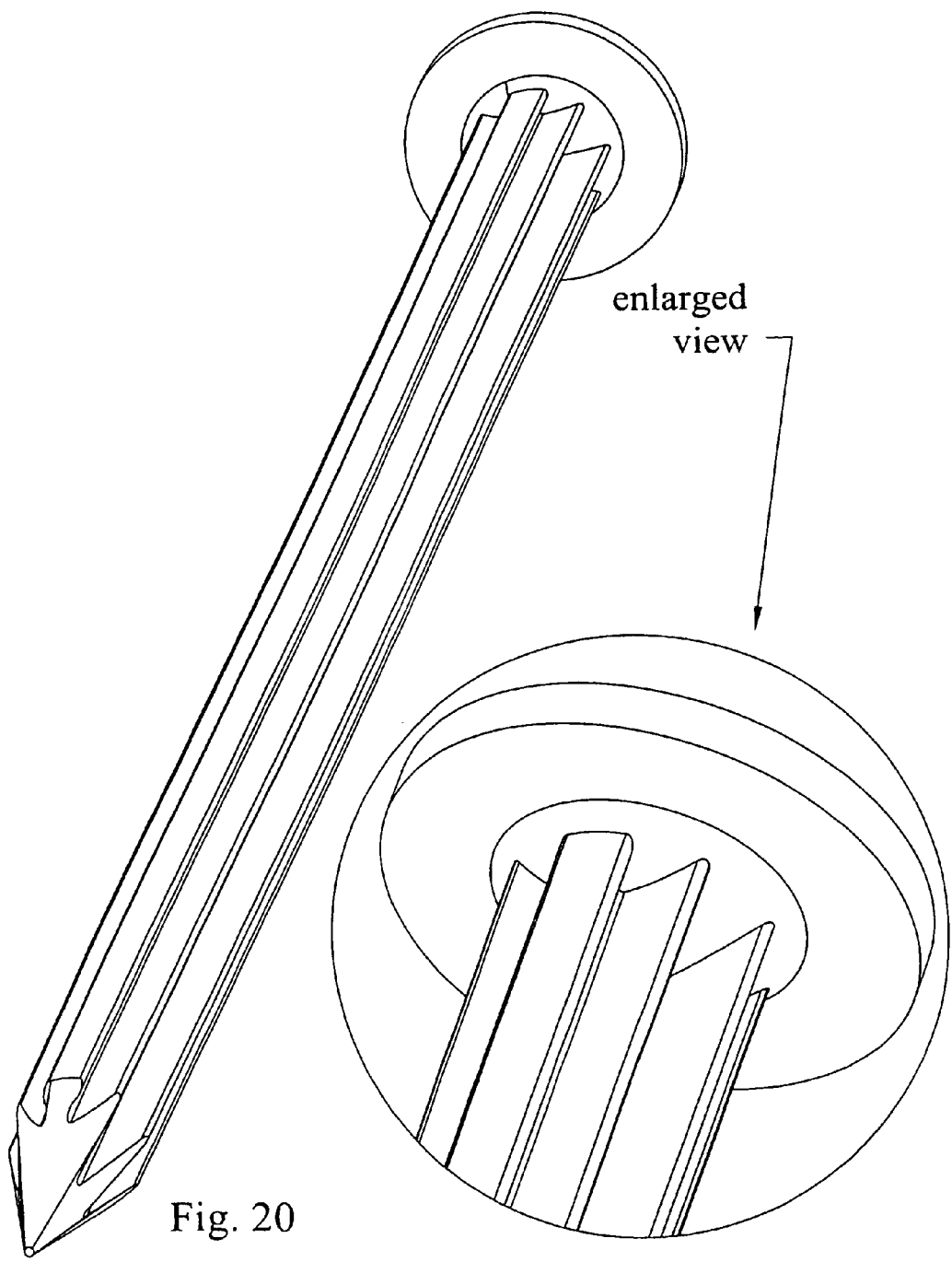

After forming as in FIG. 176, FIG. 18 shows a front view (line of sight parallel with the parting line) and FIG. 19 shows a side view (line of sight perpendicular to the parting line). These show a transition 8 from the shank to the head 9 that is formed in the die cavity at the same time that the head is formed. The transition 8 is generally conical with a base on the head 9 and a vertex projecting into the nail shank. This conical transition area will add more strength to the head area than if the nail were simply capped with a conventional head. However, in some instances it may be desirable to omit the conical transition such as: in very small nails, for nails where the head strength is of less concern, or where it is important that the head not pull through the work piece. The head shape with a conical base is a non-essential feature of the invention. FIG. 20 shows an orthographic view of one embodiment of the nail. In this view, it is possible to see the transition from the nail fins into the conical base feature and finally the relationship between the conical feature and the head.

Computer-Aided Design Process

FIGS. 21 through 38 illustrate a design process that will produce a nail shank cross-section that meets the main objectives of the invention. The figures were created using the computer program, AutoCAD 2002 (Autodesk, Inc., San Rafael, Calif.—www.autodesk.com). (Other programs with adequate capabilities may exist and could be used as well.) The area and perimeter calculations were determined using the program's area command, with the precision set to 0.00001 in. This level of precision may not always be necessary. For the purposes of illustration, dimensions presented here were rounded to 0.0001 in.

Figure 21:
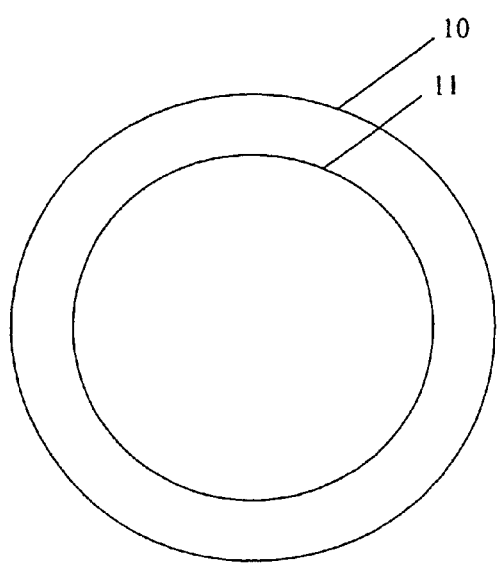
FIGS. 21-38 illustrate the steps in a method for graphically designing a bilateral nail.

As shown in FIG. 21, the first step is to draw a circle 0 that represents the bounding diameter, one that includes the maximum excursion of all fins, of a desired design. The 0.162 diameter of an 8 ga. or 16 D common nail will be used as an example. The next step is to pick the diameter 11 of the initial feedstock and draw a concentric circle with its diameter. This example shows a starting diameter of 0.120 in. This will be deformed until it creates a nail having fins and valleys with an outer bounding diameter of 0.162 in. A comparison of cross-sectional areas and perimeters will be made below.

Figure 22:
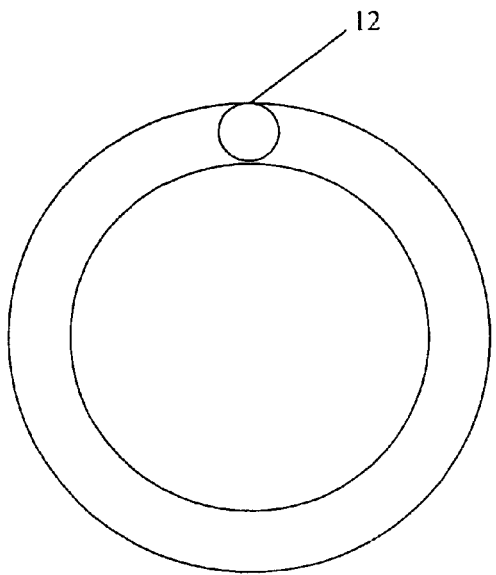

FIG. 22 shows the next step. Select an initial radius of curvature for the peaks of the fins and place it tangent to the bounding circle along any major axis. The figure shows a 0.100 radius circle located along a nominal vertical axis (with respect to the normal page orientation). The initial radius may be altered during the process, as will be illustrated.

Figure 23:
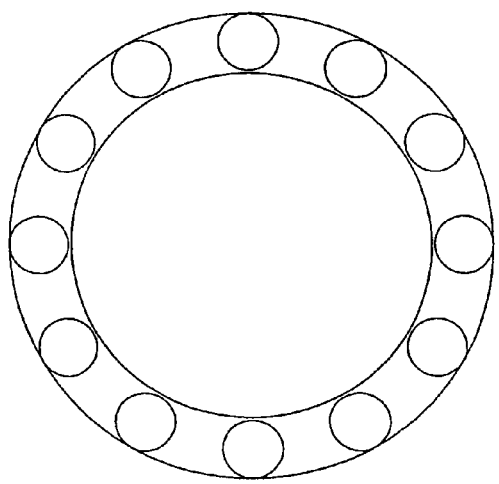

The next step is to decide how many fins are desired and place that number of starting circles equally around the bounding diameter as shown in FIG. 23. The figure shows 12 fins for this design. However, the number of fins could be as few as two or as many as desired. The final purpose of the nail will determine how many fins are most practical.

Figure 24:
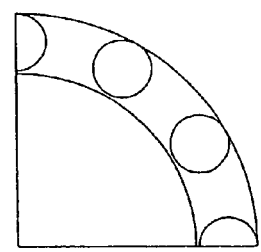

Since, for 12 fins, the desired shape will be symmetrical to the vertical and horizontal axis, it is sufficient to conduct all further operations on only one quadrant. FIG. 24 shows the upper right quadrant.

Figure 25:
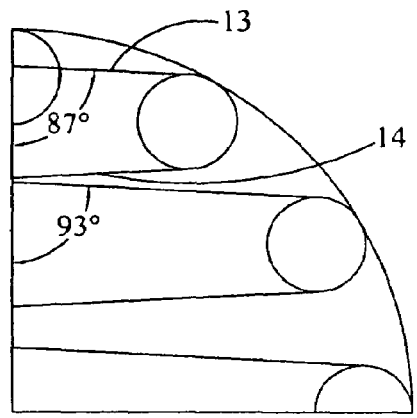
Figure 26:
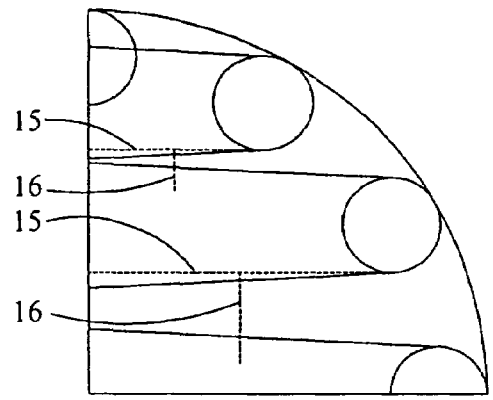

FIG. 25 shows the next step, which is to create draft lines. Ignoring the top circle, from the vertical top of each circle or part, draw a line 13 toward the vertical axis at an angle of 87° as shown. This will create a 3° draft angle that will allow the part to release from the die. The 3° value may vary in practice, but is used here for illustration. From the bottom of each circle, draw a line 14 toward the vertical axis at an angle of 93° as shown. This also creates a 3° draft angle. These lines are the draft lines. Of course, different draft angles can be used as required.

The next step is to determine how deep will be the valleys between fins. As an example, assume a depth of half way as will be explained with reference to FIG. 26. Draw a horizontal construction line 15 from the bottom of each complete circle to the vertical axis. Divide these construction lines in half with vertical construction lines 16 that cross through the pair of draft lines immediately below.

Figure 27:
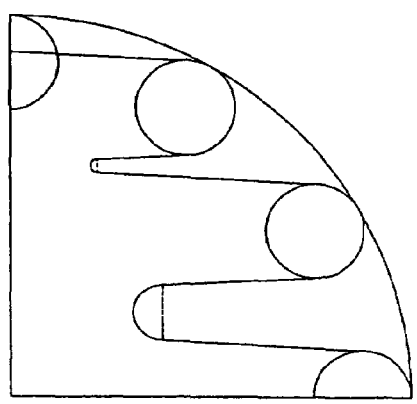

FIG. 27 shows the step of trimming the dashed construction lines to the draft lines, and connecting the resulting pairs of draft lines with arcs that have a diameter equal to the distance between the trimmed draft lines.

Figure 28:
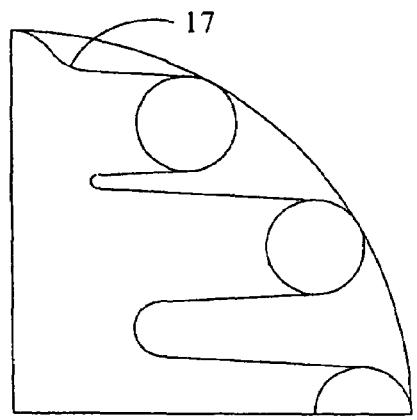
Figure 29:
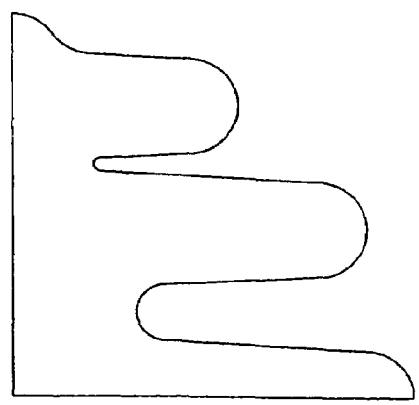

FIG. 28 shows filleting 17 the single upper remaining draft line to the upper half circle, using a fillet radius equal to the radius of the outer arrayed circles, in this case 0.010 in. Next, trim the circles to create a closed shape, and remove all guidelines to produce the result shown in FIG. 29. Based on this, calculate the area of the new shape. Since this is a quadrant, compare this area to that of ¼ of the starting wire area. In this example the area of the new shape is 0.0038 in. and ¼ of the starting wire area is 0.0028 in. The new shape is 0.0010 in. too large. This shape has too much area, which means that the outer fin radius size should be reduced, while the valley radius size should be enlarged. The following steps show how to do this.

Figure 30:
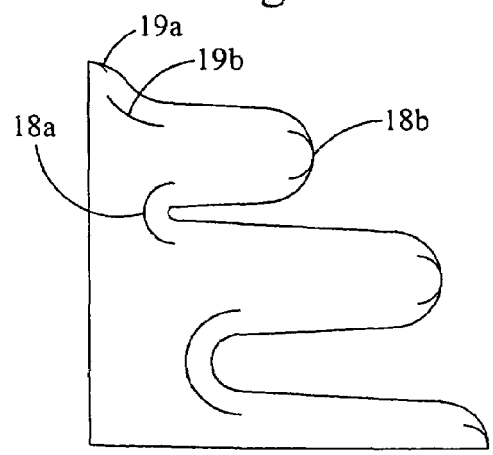

As shown in FIG. 30, the valley radii 18a will be reduced by, for example, 0.005 in. The outer fin radii 18b will be increased by the same 0.005 in. and offset toward the vertical axis by the same amount. If the fin radii increase by the same amount as the valley radii decrease, then the draft angle is maintained. If the valley radii are offset toward the vertical axis, then the draft angle is increased slightly.

Figure 31:
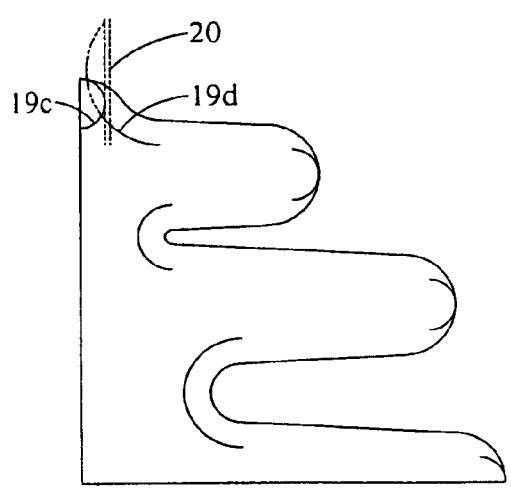
Figure 32:
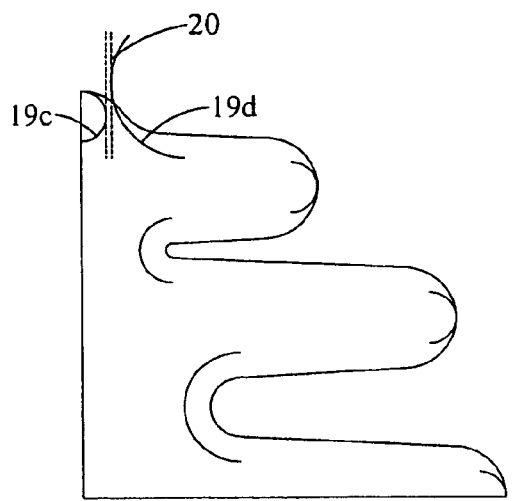

The fillet radii 19a and 19b require an extra step. The radius 19b must be moved away from radius 19a so that the two radii can be connected with a tangent line. To move 19b, begin by creating vertical construction lines 20 as shown in FIG. 31. Extend the arc of radius 19a to form semicircle 19c so that its maximum extent is known. Then construct parallel vertical tangents 20 with a separation of some minimal amount such as 20% of the smallest radius, in this case, 0.001 in. This assures that a radius 19b can be translated horizontally and expanded to form the partial circle 19d tangent to the rightmost vertical tangent of 20. Because of the separation in the tangent lines 20, it is always possible to find a straight line that connects the part circles 19c and 19d with a straight line.

Figure 33:
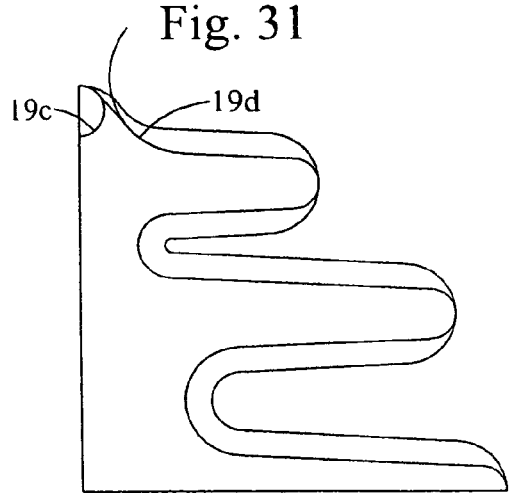
Figure 34:
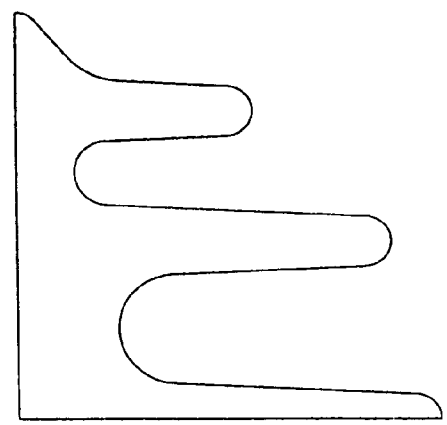

In FIG. 33, arcs 19c and 19d are connected along with the peak and valley arcs 18a and 18b. After the original outline is trimmed away, FIG. 34 shows the new shape. At this point, the new area should be calculated. In FIG. 34, it is 0.0026 sq. in., about 0.0002 sq. in. too small.

Figure 35:
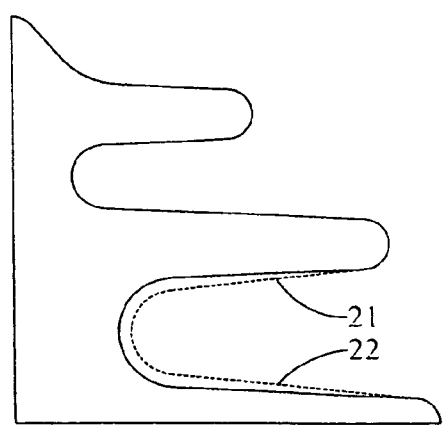

To increase the area slightly, offset the lower valley arc away from the vertical axis by an estimated amount (here it was 0.0024 in.), as in FIG. 35. Connect this new arc to the outer arcs by straight tangent lines 21 and 22. Design judgment and experience will guide the nail designer to alter the feature that is most likely to enhance the final nail shape. In this case, the lower shape was altered to increase the amount of material near what will become the middle of the nail.

Figure 36:
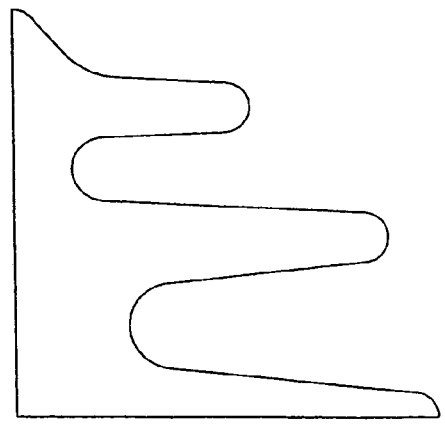

Trim away the replaced sections and recalculate the area of the new shape, FIG. 36. If it still does not match, repeat the previous procedure using a smaller or larger arc until the newly created shape is ¼ the area of the starting wire area. Here, the new shape is 0.0028 sq. in., which matches ¼ of the starting wire's area, so no further adjustments are necessary.

Figure 37:
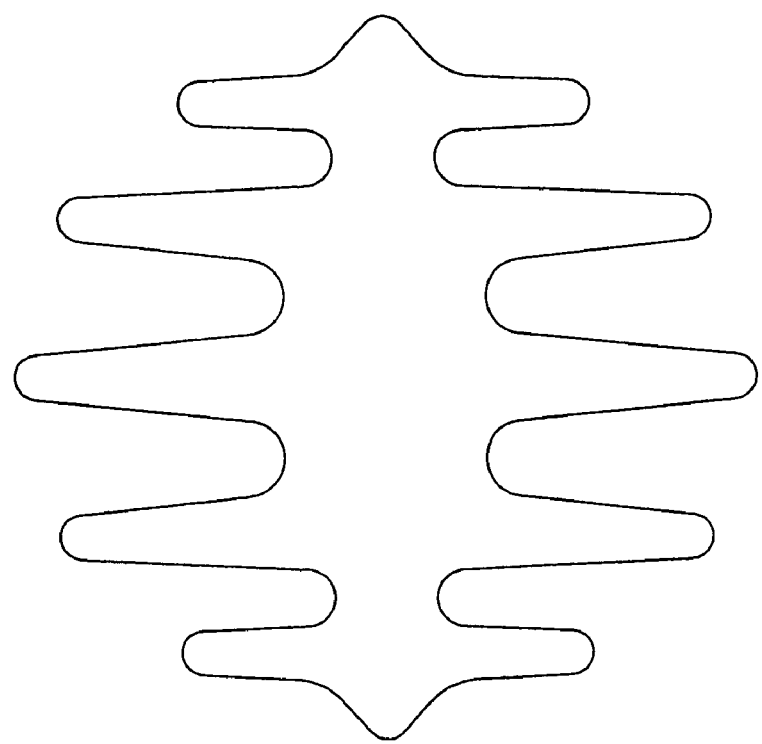

Lastly, mirror the new shape along both the vertical and horizontal axis and remove the axis lines resulting in the complete shape shown in FIG. 37.

Figure 38:
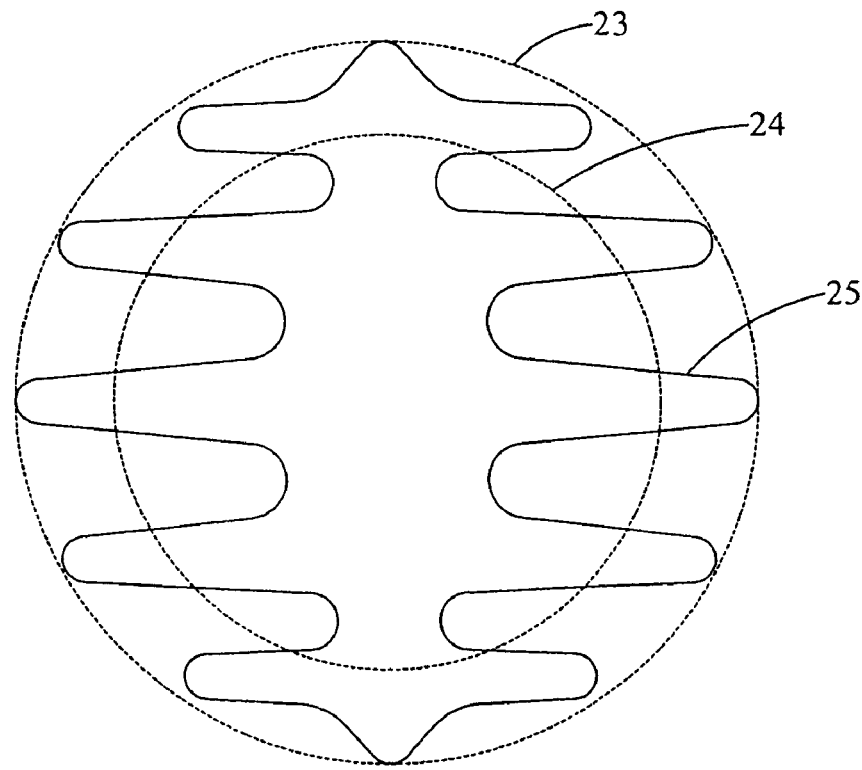

FIG. 38 compares the new design's dimensions 25 to two round wire sizes 23 and 24. The new design 25 has the same circular bounding diameter, 0.1620 in., as an 8-gauge, 16 D, common nail, 23. Also, the new design has a perimeter of 1.376 in., 171% more than the 0/5089 in. perimeter of the nail and therefore considerably more holding power, according to one theory. The cross-sectional area is 0.0113 sq. in. compared to 0.0206 sq. in. for the 16 D nail. The material used is about 55% of that used by the nail, a 45% savings.

Compared to a round nail 24 using the same amount of material, the new design has a bounding diameter that is 35% larger and a perimeter of that is 365% larger. Moreover, the bending moment is larger because the same material has been converted into structure that is thinner but has a larger effective diameter. Since beam strength is proportional to the square of the dimension in the plane of bending, the new design will be stronger.

There are so many possible variations of the improved nail described herein that it is impossible to anticipate how a nail designer will create each embodiment. Before a shape is created, the designer will need to consider many factors. The starting metal shape may be round or some other shape, the number of fins may be few or many, the desired amount of material reduction may be great or small, the fins may be sharp or rounded and the nails may be large or small. With all that in mind, the preceding design process yields what is currently thought to be one of the better designs for an ordinary nail.

Although the 45% material savings in the example is fairly substantial, this amount is by no means necessary. Since raw material is a large part of nail costs, a savings of 15% or even 10% is commercially attractive.

Nail Pointing

After the two-part die is separated, conventional point making cutters could be used in a separate operation to form a pointed nail. Although not an essential feature of the invention, another method utilizing a modified split die to form a point may be advantageous.

Figure 39:
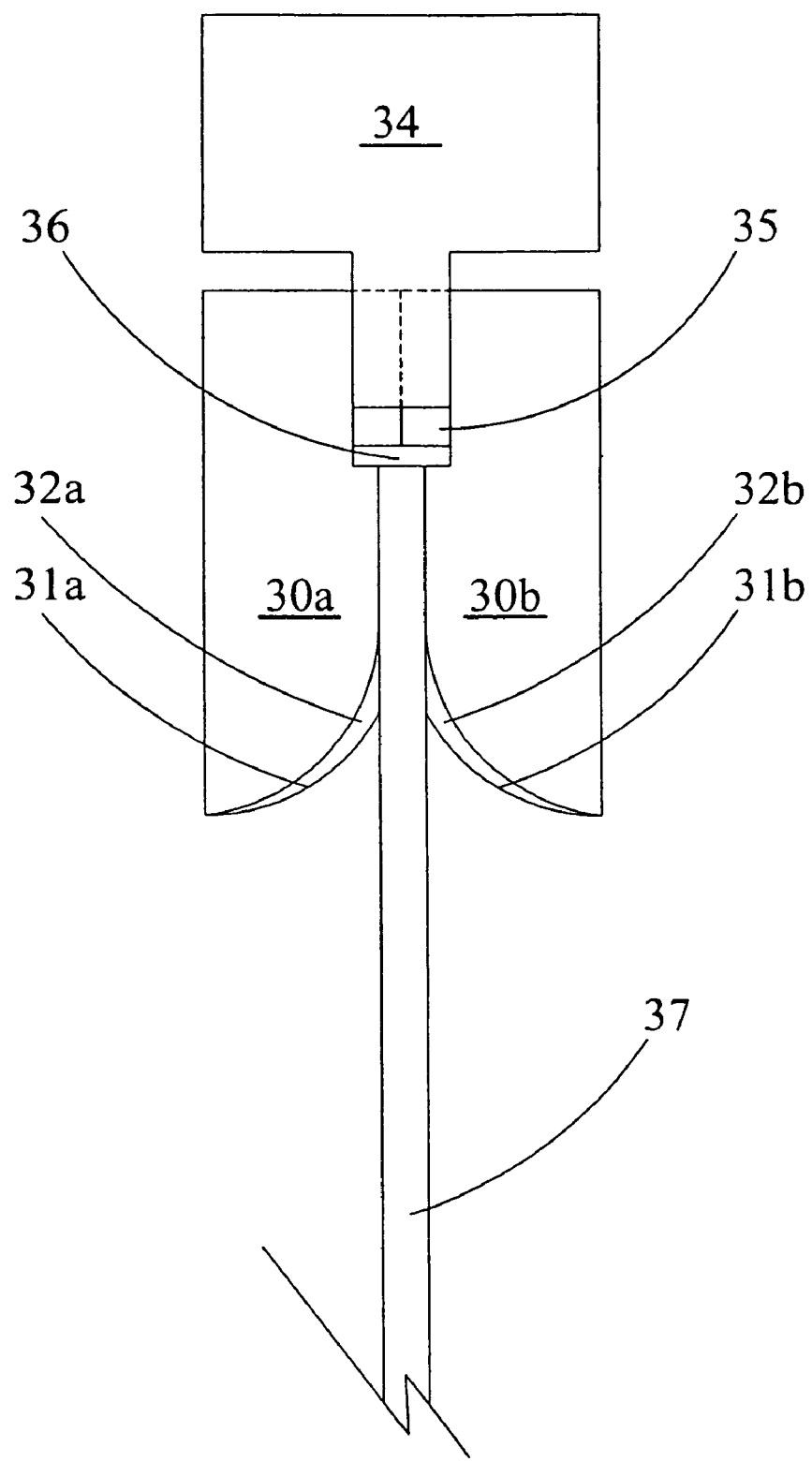
FIGS. 39-41 illustrate an apparatus and process for forming a head and point on a finished nail.

As illustrated in the cross-sectional drawing in FIG. 39, this split die would be formed so that its two halves 30a and 30b would have curved bottoms with outside edges 31a and 31b and curved surfaces 32a and 32b, respectively. A right angle section through the curved surfaces (perpendicular to the plane of the paper) approximates a concave quarter circle in the drawing. In other words, each die 30a and 30b would have a half conical negative shape in this region. This conical negative shape would include a continuation of the bilateral nail shape (not illustrated in the drawings) proportionally scaling down as it approached the point of the cone. The fins would gradually disappear. Optionally, a faster transition to a round shape, as indicated in the drawings, could be made. Also illustrated, are a head forming cavity 35 and a head forming tool 34.

In operation, first, the split die parts 30a and 30b are brought together with sufficient pressure to form the bilateral nail shape. Then, with the partially formed nail still held by the split die 30a and 30b, head forming die 34 would be pressed into the cavity 35 to form the head 36 (illustrated without a transition). At this point, the lower end of the wire 37 would still be part of the continuous spool of wire.

Figure 40:
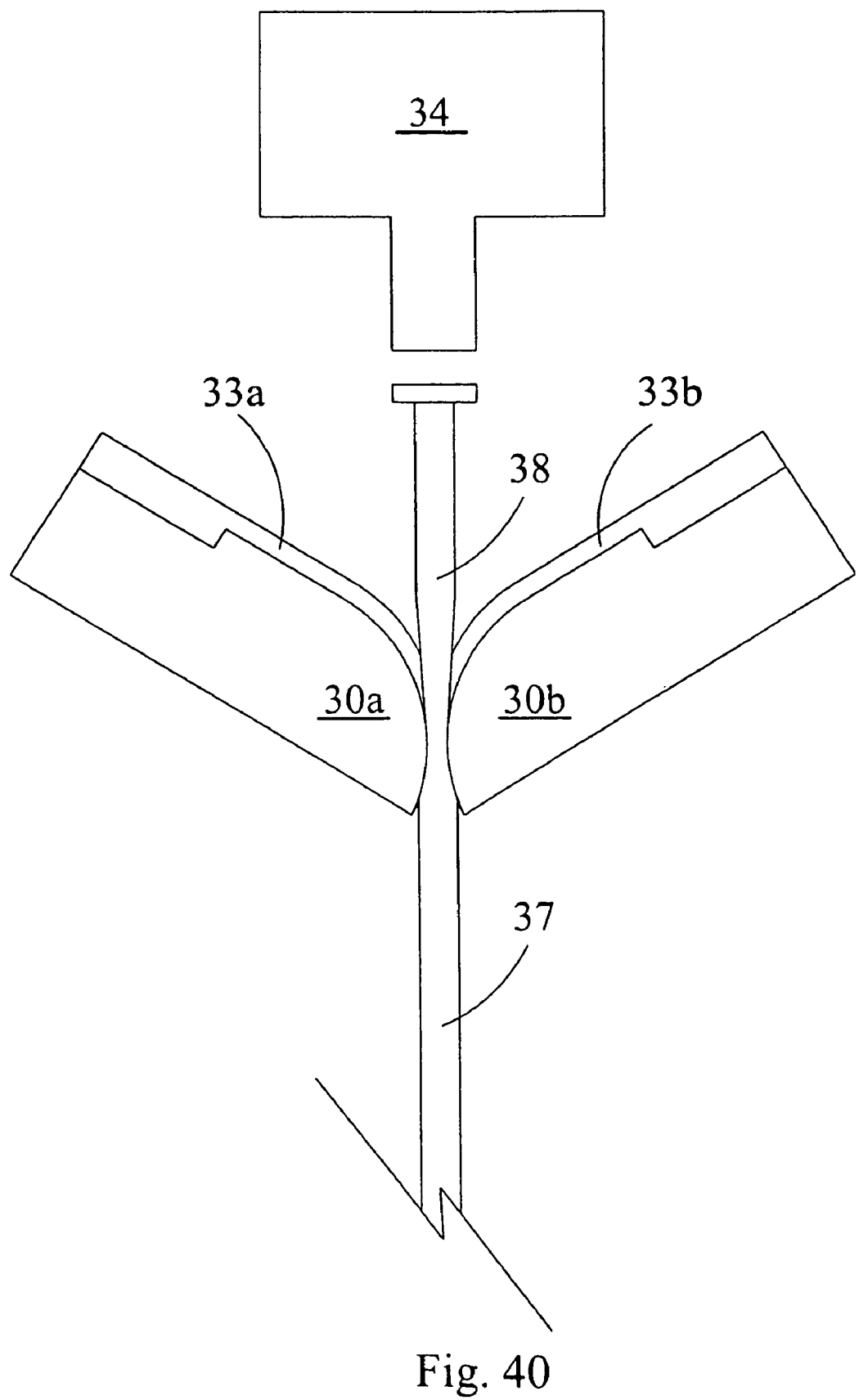
Figure 41:
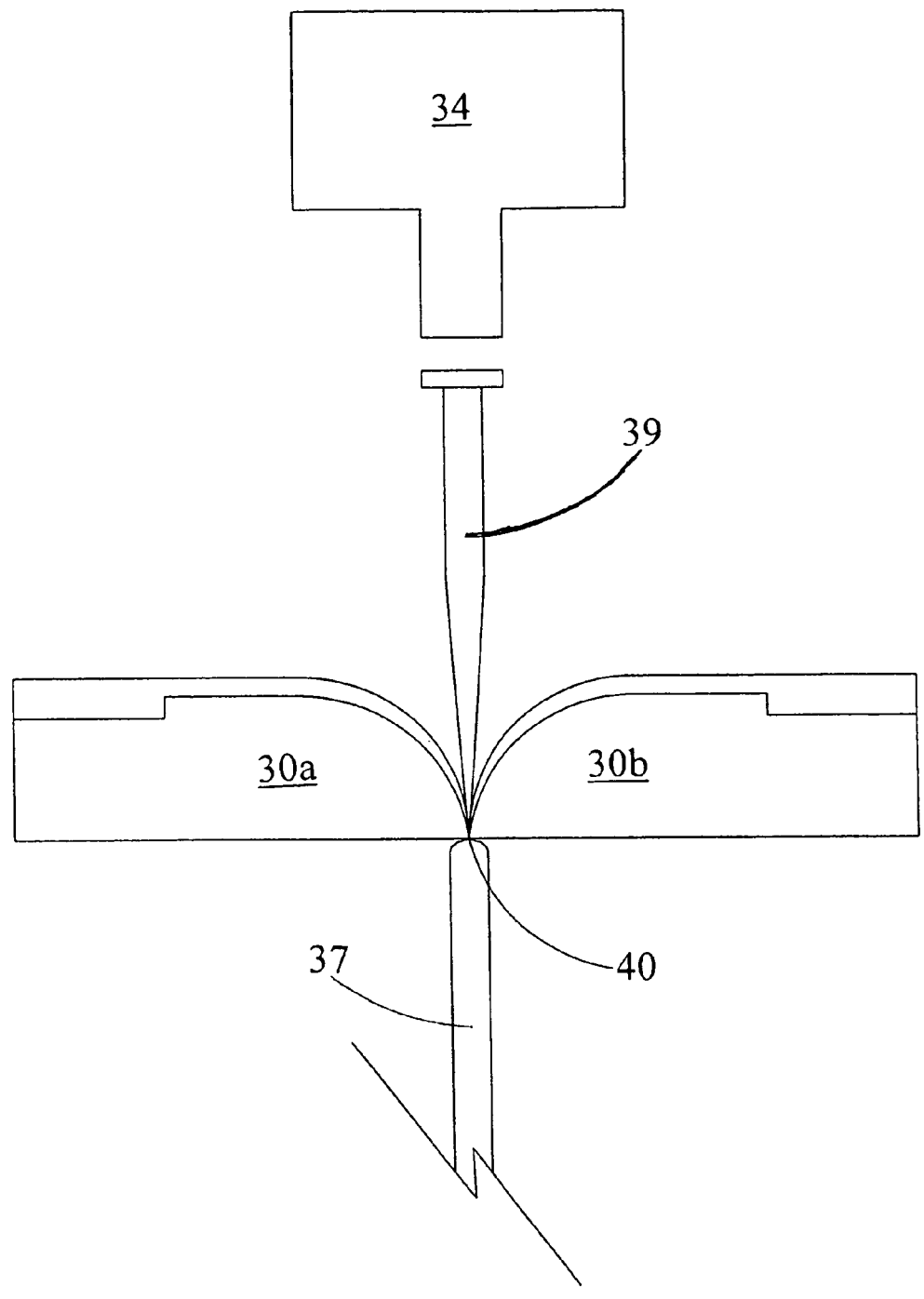

A pointed finished nail 38 can be formed by rotating the die parts 30a and 30b as illustrated in FIG. 40. As the parts 30a and 30b are rotated, the bottom surfaces 33a and 33b form a bilateral nail (or other shape), but with decreasing dimensions. Ultimately, as FIG. 41 illustrates, the nail dimensions would be small enough to form a point 40. Making the point small enough would pinch off the wire bar feedstock from the now finished nail 39.

Making the entire nail requires that dies 30a and 30b execute a transverse movement wherein they are squeezed together followed by a rotational movement. The rotation may not be about a fixed axis. However, since all movements are in a plane, it should not be difficult to construct a series of cams or use four or more hydraulic actuators that would carry this out. The curvature of the surfaces 32a and 32b in the plane of the paper need not be circular, but could be tailored to simplify die rotation. At least one practical solution to all of these problems is believed to be straightforward and well within the skill of nail making machine designers.

WORKING EXAMPLES

Figure 42:
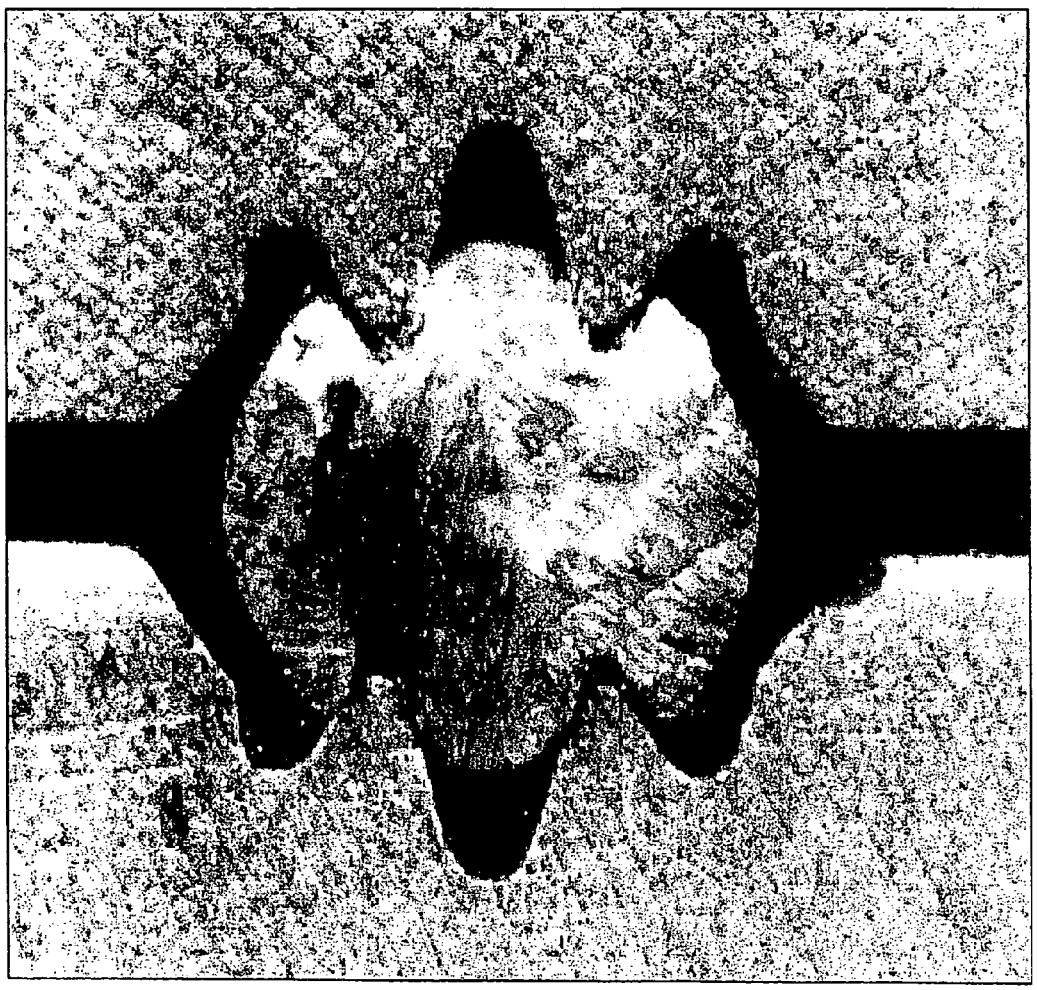
FIG. 42 is a black and white photomicrograph of a nail shank being formed between two compression dies.

FIG. 42 is a black and white photomicrograph of the results of a proof-of-concept experiment. It shows a nail in accordance with the present invention being formed from mild-steel wire by compression between two steel dies. The shape was similar, but not identical to FIG. 4 and not produced in accordance with the method outlined in FIGS. 21-38. It was an approximation produced by an EDM machine operator.

The end of the nail in the photomicrograph was produced by cutting with a saw blade. The original wire diameter was about 0.14 inches and 6 inches long. The dies were compressed with a small 50-ton hydraulic press, but this was not enough force to close the gap between the two dies. It is estimated that a 150-ton press would have been adequate.

Figure 43:
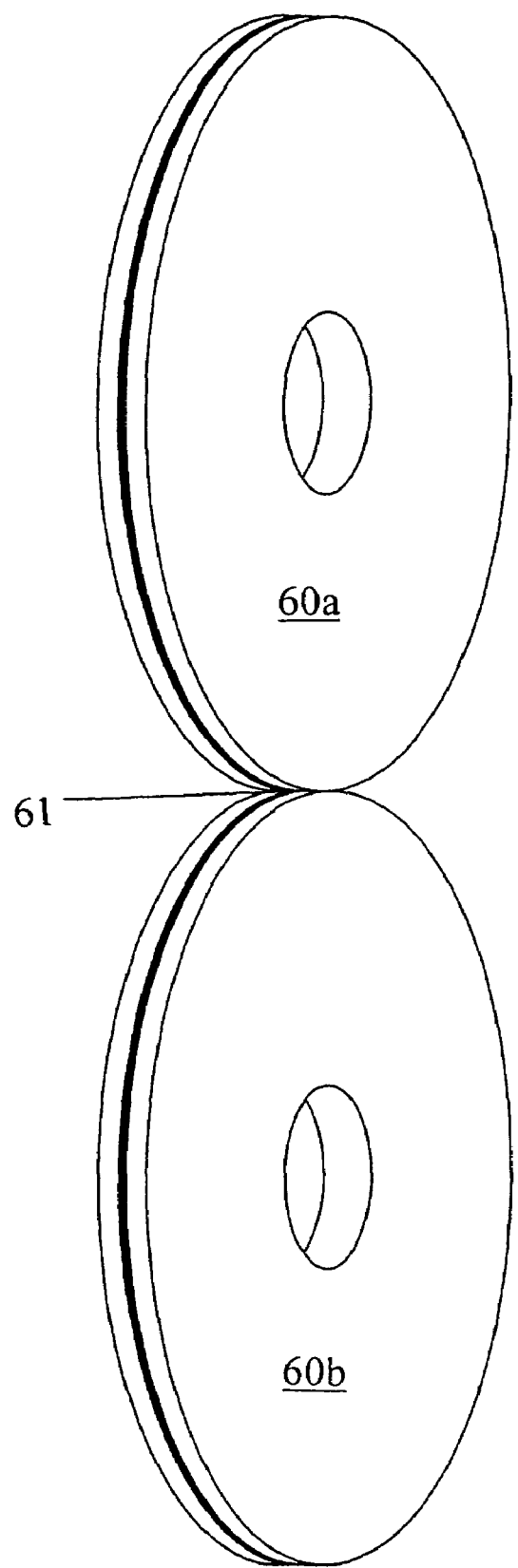
FIG. 43 illustrates an apparatus for forming nail shanks using two opposed rollers.
Figure 44:
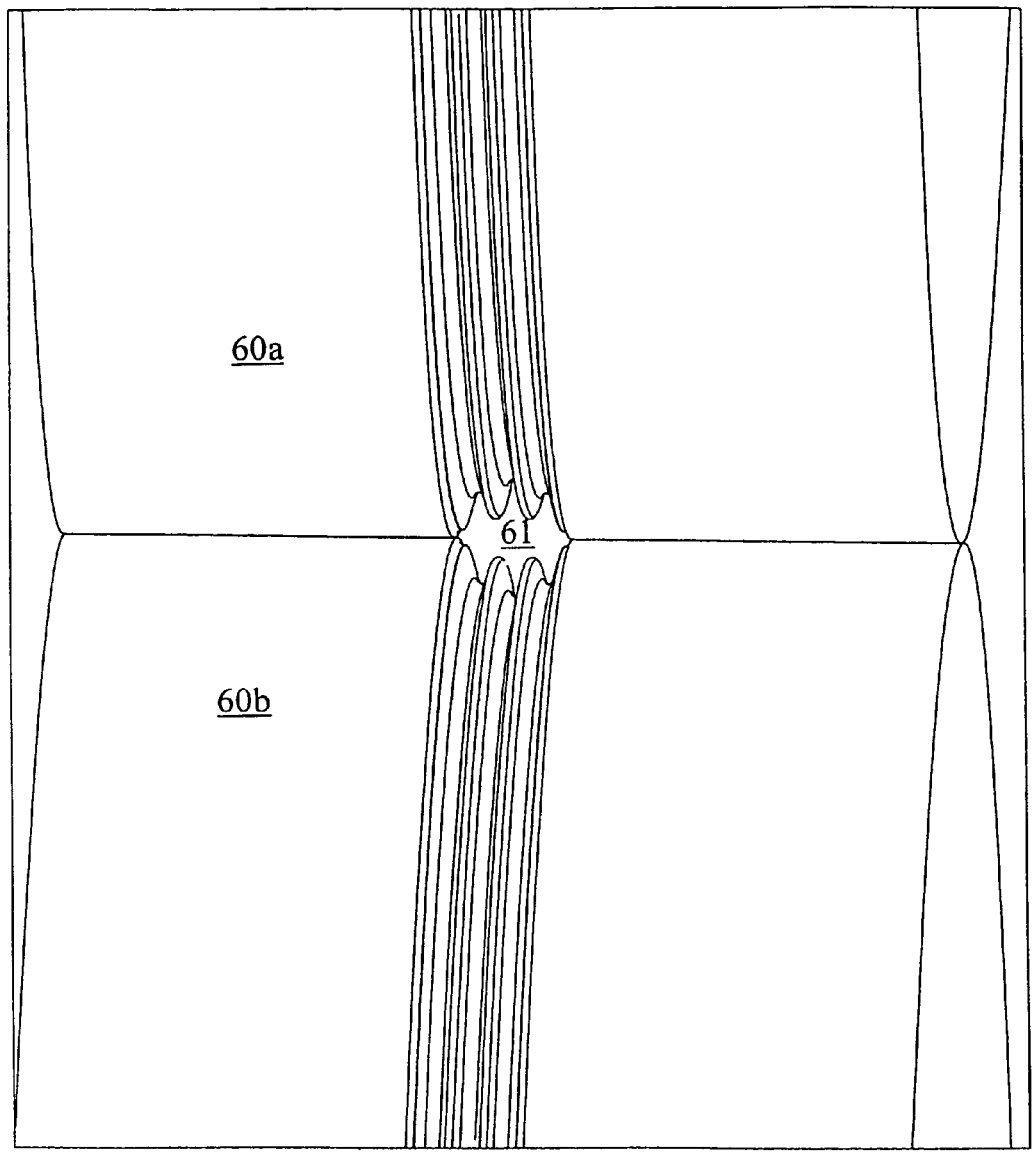
FIG. 44 is an enlarged off-axis view of the throat area in FIG. 43 showing the cross-section.

FIG. 43 illustrates another method of producing the nails using a pair of rollers 60a and 60b. A wire is fed into the throat 61 as the rollers turn. FIG. 44 shows a cross-section of the throat in more detail. This cross-section was also similar to FIG. 4, but with more pointed ribs and was produced on a lathe using a cutting tool. The rollers were about 9 inches in diameter and held against each other in a simple jig (not shown). The existence of a bi-lateral parting line means that two directly opposing rollers can be used in a relatively simple machine. To form a shank, the rollers were turned by hand at low speeds by turning one roller in order to turn the other as wire was fed into the throat. This worked well with aluminum, but steel had not been tried at the time of filing this application.

Figure 45:
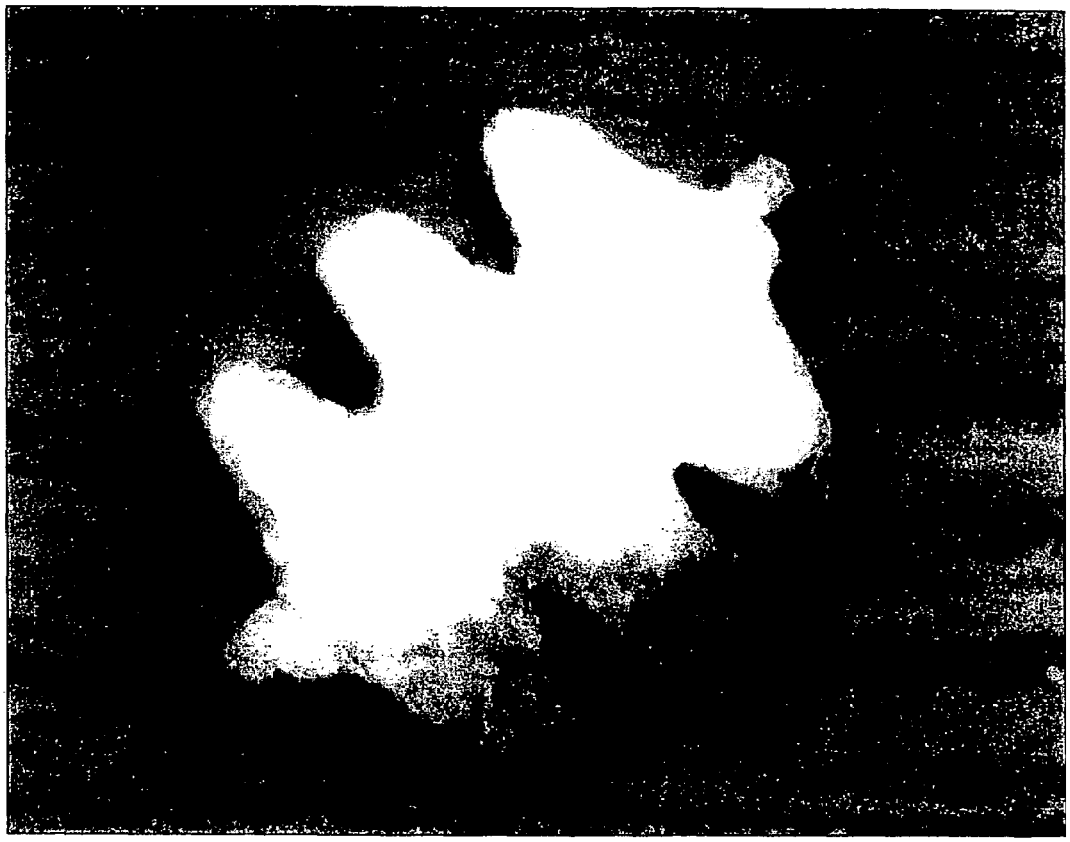
FIG. 45 is a black and white photomicrograph of a nail shank that has been formed by the rollers illustrated in FIGS. 43 and 44 slightly protruding through a mahogany sheet.

FIG. 45 is a black and white photomicrograph of the results of an experiment with the rollers, illustrated in FIGS. 43 and 44. This figure shows a cut-off cross-section that was driven through a 3/8 inch thick mahogany sheet. One can see the grain in the wood and how the perimeter of the shank makes contact with the wood over a much larger area than an equivalent weight round nail would have.

Based on data for the roller cross-section, the area is 0.013 inches. An equivalent round nail would have a diameter of 0.13 inches and a perimeter of 0.404 inches. The perimeter of this cross-section is 0.724 inches, about 80% more, and the approximate diameter is 0.155 inches, a 20% increase. (The actual shank in FIG. 45 is not a perfect replica of the roller throat.) Although the invention is not bound by any theory, these are significant improvements based on either the theory that it is the shank perimeter that produces holding power or the theory that is only a function of shank diameter.

The method that is used to produce the nails in commercial production quantities will depend on a number of production factors. Either die stamping short pieces or rolling wire with additional cutting, pointing and heading operations could be used. This art is old and fairly well developed so that it would not be difficult for one of ordinary skill to adapt these or other methods to produce nails having the shapes of this invention.

While the best mode for carrying out the invention has been disclosed, it should be understood that the description is only illustrative of a range of equivalents. For example, nothing herein limits the invention to nails made from steel or aluminum or those designed purely for wood.

While nails usually have heads and points, the novel fastener cross-sectional design disclosed herein may be applied to fasteners that lack one or more of these structures. Those skilled in the art will be able to apply unforeseeable equivalents of the invention disclosed herein to a range of applications.

Thus, the limits on the invention are set out in the following claims. In the claims, it should be understood that a "parting line" puts inherent limitations on the structure on both sides of it as discussed above with respect to FIG. 1.

What is claimed as new and what it is desired to secure by Letters Patent of the United States is:

1. A fastener comprising:
   an elongated shank having a reduced taper at one end, said shank having a cross-sectional shape with a predetermined periphery that is bisected by a straight parting line in two spaced locations on said shank periphery, said parting line intersecting no voids within said shank and defining a pair of opposed side portions of said shank, said parting line being defined as a cross-section of a shape when two opposing dies meet in the formation of the shape;
   said predetermined periphery including at least one spaced fin-like protuberance on each of said opposed side portions protruding at approximately right angles to said parting line, each said protuberance having a substantially straight side on any side facing an adjacent said protuberance on each said side portion of said shank; and
   a pair of intervening valleys disposed respectively on opposed sides of said at least one protuberance on each said side portion and curved inwardly toward and terminating short of said parting line.

2. The fastener of claim 1 wherein said shank includes an enlarged head at its other end opposite said one end.

3. The fastener of claim 1 further comprising a pair of protuberances on respective opposed ends of said parting line.

4. A fastener comprising:
   an elongated shank having a reduced taper at one end, said shank having a cross-sectional shape with a predetermined periphery that is bisected by a straight parting line in two spaced locations on said shank periphery, said parting line intersecting no voids within said shank and defining a pair of opposed side portions of said shank, said parting line being defined as a cross-section of a shape when two opposing dies meet in the formation of the shape;
   said predetermined periphery including at least two spaced fins on each of said opposed side portions protruding at approximately right angles to said parting line, each said fin having a substantially straight side on any side facing an adjacent said fin on each of said side portions;
   an intervening valley disposed between any adjacent said fins on either of said opposed side portions of said shank; and
   said shank having a pair of arcuate shapes protruding therefrom and further defining said periphery, said arcuate shapes being disposed respectively at opposed spaced locations defined by intersections of said parting line and said periphery.

5. The fastener of claim 4 comprising at least three fins on each said side portion of said shank.

6. The fastener of claim 4 wherein said shank has a cross-section that is approximately symmetrical with respect to said parting line.

7. The fastener of claim 4 wherein each of said arcuate shapes extends less than about 90 degrees.

8. The fastener of claim 7 wherein said fins include tips approximately coincident with a bounding circle concentric with a longitudinal axis of said shank.

9. A fastener comprising:
   an elongated metal shank having a point at one end, said shank having a cross-sectional shape with a predetermined periphery that is bisected by a straight parting line in two spaced locations on said shank periphery, said parting line intersecting no voids within said shank and defining a pair of opposed side portions of said shank, said parting line being defined by the meeting of two opposing dies in the formation of said shank;
   said predetermined periphery including at least two spaced fins on each of said opposed side portions protruding at approximately right angles to said parting line, each said fin having a substantially straight side on any side facing an adjacent said fin on said side portions of said shank;
   an intervening valley disposed between any adjacent said fins on either of said opposed side portions of said shank; and
   said shank including two fins protruding approximately aligned with said parting line and disposed respectively at two spaced locations at intersections of said shank periphery and said parting line.

10. The fastener of claim 9 comprising at least three said fins on each side portion of said shank.

11. The fastener of claim 9 wherein said shank has a cross-section which is approximately symmetrical with respect to said parting line.

12. The fastener of claim 9 wherein each of said sides of said at least two fins on each said side portion has a draft angle of about 3 degrees.

13. The fastener of claim 9 wherein said intervening valleys curved inwardly toward and terminate short of said parting line.

14. The fastener of claim 9 wherein said fins include tips of said fins approximately coincident with a bounding circle concentric with a longitudinal axis of said shank.

15. The fastener of claim 14 wherein each said side of said at least two fins on each said side portion has a draft angle of about 3 degrees.

16. The fastener of claim 15 wherein said shank has a cross-sectional area that is less than about 55% of a cross-sectional area of said bounding circle.

17. The fastener of claim 14 comprising at least three said fins on each side portion of said shank, each said side of said at least three said fins on each said side portion has a draft angle of about 3 degrees.

18. The fastener of claim 17 wherein said shank has a cross-sectional area that is less than about 55% of a cross-sectional area of said bounding circle.

* * * * *